United States Patent [19]

Reid

[11] Patent Number: 4,869,490
[45] Date of Patent: Sep. 26, 1989

[54] INCREMENTAL MOTION MECHANISM

[75] Inventor: Bruce A. Reid, Elmira, Canada

[73] Assignee: NCR Corporation, Dayton, Ohio

[21] Appl. No.: 84,951

[22] Filed: Aug. 13, 1987

[51] Int. Cl.$^4$ .............................................. B65H 3/52
[52] U.S. Cl. .................................. 271/122; 271/125; 74/125.5; 74/142
[58] Field of Search .................... 271/121, 122, 125; 192/48.92; 74/141.5, 142, 125.5

[56] References Cited

U.S. PATENT DOCUMENTS

| | | | |
|---|---|---|---|
| 2,399,530 | 4/1946 | York et al. | 74/142 |
| 2,892,629 | 6/1959 | Osgood, Jr. et al. | 271/39 |
| 2,981,118 | 4/1961 | Morrill | 74/142 |
| 2,997,889 | 8/1961 | Schjeldahl | 74/125.5 |
| 3,172,554 | 3/1965 | Fickle | 214/519 |
| 3,263,316 | 8/1966 | Schrader | 29/203 |
| 3,405,813 | 10/1968 | Davis et al. | 214/5.5 |
| 3,408,878 | 11/1968 | Bertao | 74/126 |
| 3,636,781 | 1/1972 | Elliott | 74/125.5 |
| 3,668,942 | 6/1972 | Landis et al. | 74/142 |
| 3,673,879 | 7/1972 | Plate et al. | 74/125.5 |
| 3,754,754 | 8/1973 | Peterson | 271/36 |
| 3,961,786 | 6/1976 | Yanker | 271/122 |
| 4,109,539 | 8/1978 | Feleus | 74/125.5 |
| 4,316,606 | 2/1982 | Buys et al. | 271/122 |
| 4,368,881 | 1/1983 | Landa | 271/122 |
| 4,638,987 | 1/1987 | Sakurai | 271/122 |
| 4,651,983 | 3/1987 | Long | 271/125 |
| 4,695,048 | 9/1987 | Görner | 271/122 |

FOREIGN PATENT DOCUMENTS 190573  8/1986  European Pat. Off. .

OTHER PUBLICATIONS

*IBM Tech Disclosure*, Sep. 1975, G. L. Sokol, "Wear Compensation and Roll Gap Generator".

Primary Examiner—Joseph J. Rolla
Assistant Examiner—Steven M. Reiss
Attorney, Agent, or Firm—Wilbert Hawk, Jr.; Albert L. Sessler, Jr.; Elmer Wargo

[57] ABSTRACT

An incremental motion mechanism which utilizes first and second one-way clutches attached to the output shaft of the mechanism. The first one-way clutch is used to prevent back up of the output member, while the second one-way clutch is used to incrementally rotate the output shaft. First and second solenoids and associated linkage under the control of a controller are used for adjusting the extent of rotation of the output shaft.

8 Claims, 2 Drawing Sheets

INCREMENTAL MOTION MECHANISM

BACKGROUND OF THE INVENTION

This invention relates to an incremental motion mechanism, and more particularly, it relates to a ratchet-type mechanism which does not use teeth or the usual pawl member.

One of the problems with the usual ratchet-type mechanism is that there is generally some back-up involved with the ratchet wheel before it becomes fixed or held in position. Another problem with some of these mechanisms is that they are generally complicated to adjust the "throw" of the mechanisms when such versatility is available.

SUMMARY OF THE INVENTION

In contrast with the prior art mechanisms, the intermittent motion mechanism of this invention avoids the back-up mentioned before the mechanism becomes fixed in its new position. In addition, the mechanism of this invention provides an easy way for adjusting the "throw" of the mechanism.

In one aspect, a preferred embodiment of the invention relates to an apparatus for feeding documents, including: a feed roller and means for rotating said feed roller in a first direction of rotation; a stripper roller in operative engagement with said feed roller; and incremental means for incrementally rotating said stripper roller; said incremental means comprising: a shaft having said stripper roller secured thereto; a frame for rotatably supporting said shaft for rotation; a first one-way clutch secured to said shaft and said frame to permit said shaft to rotate only in said first direction; a second one-way clutch secured to said shaft; operating means secured to said second clutch to rotate said stripper roller incrementally in said first direction whenever said operating means is energized; and means for energizing said operating means.

In another aspect, this invention relates to an incremental motion mechanism including: a frame; an output shaft rotatably mounted in said frame; and incremental means for incrementally rotating said output shaft; said incremental means comprising: a first one-way clutch secured to said shaft and said frame to permit said shaft to rotate only in a first direction; a second one-way clutch secured to said shaft; operating means secured to said second clutch to rotate said output shaft incrementally in said first direction whenever said operating means is energized; and means for energizing said operating means, said adjustment means including an actuator arm secured to said second one-way clutch, with said actuator arm being incrementally rotated by said adjustment means.

The advantages mentioned, and others, will become more readily understood in connection with the following description, claims, and drawing.

DETAILED DESCRIPTION OF THE INVENTION

Figure 1:
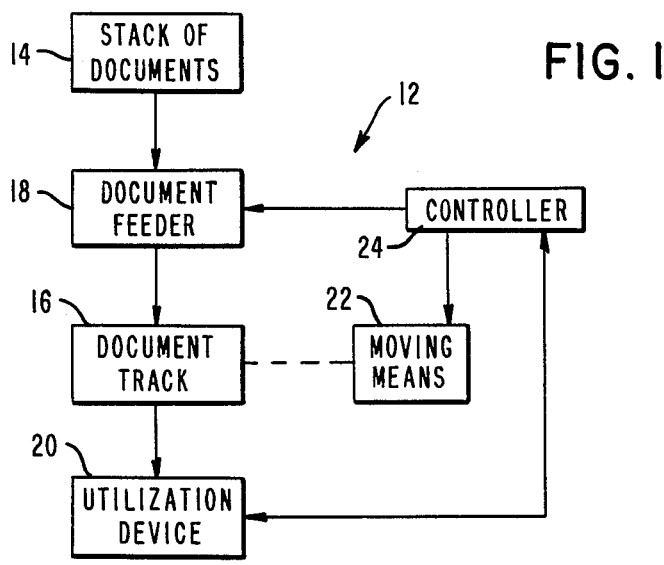
FIG. 1 is a general schematic diagram showing a document feeder apparatus in a typical environment, with the incremental motion mechanism of this invention being included in the document feeder.

FIG. 1 is a general schematic diagram showing a typical environment in which the incremental motion mechanism 10 (FIG. 2) of this invention may be used. The environment shown in FIG. 1 may be a business machine, like an encoder 12, which performs the function of printing data on documents, like checks, for example. Documents to be processed are stored in a stack 14, and they are moved from the stack 14 to a document track 16 by a document feeder 18. Once the documents are in the document track 16, they are moved along therein to a utilization device 20 by a conventional moving means 22 under the control of a controller 24. The utilization device 20 may be an encoder or sorter, for example, depending upon the particular business machine being discussed.

Figure 2:
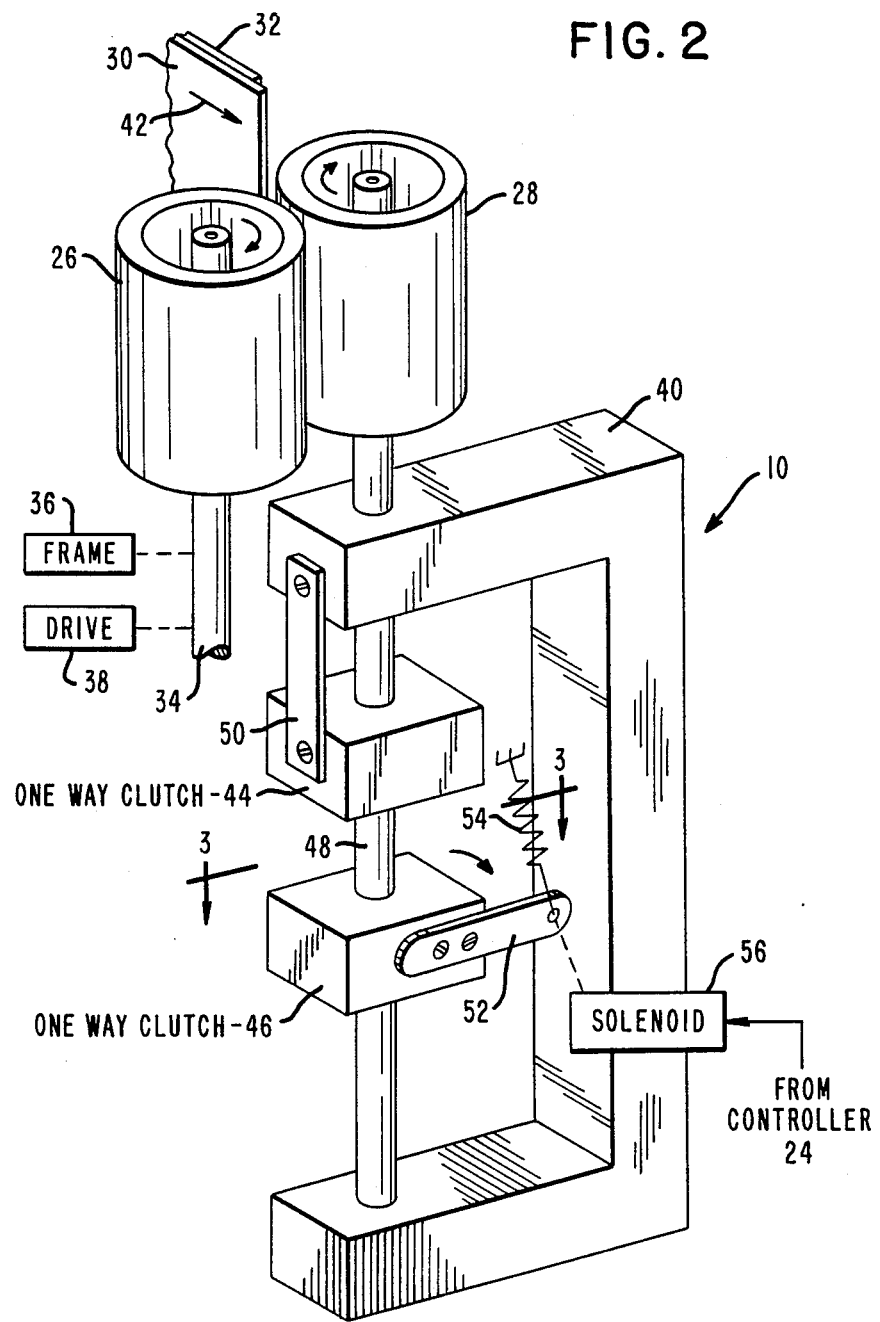
FIG. 2 is a digrammatic view, in perspective, of a preferred embodiment of this invention, showing the incremental motion mechanism in a typical environment.

The incremental motion mechanism 10, hereinafter referred to as mechanism 10 (FIG. 2), is part of the document feeder 18 shown in FIG. 1. The document feeder 18 includes the feed roller 26 and the stripper or retard roller 28 which provide the function of feeding only one document, like 30, at a time, into the document track 16. As shown in FIG. 2, the feed roller 26 is mounted on a shaft 34 which is rotatably mounted in the frame 36. The feed roller 26 is rotated at a constant velocity in a clockwise direction (as viewed in FIG. 2) by a motor or drive 38 which is under the control of the controller 24.

The retard roller 28 is rotatably mounted in the frame 40 which is generally "C"-shaped, as shown in FIG. 2. The retard roller 28 and the feed roller 26 each have a resilient layer on the associated periphery thereof, and these rollers are spaced apart a distance which permits only one document, like 30, to pass therebetween. The retard roller 28 is normally held stationary by the mechanism 10; however, it is incrementally rotated, periodically, to prevent a wear line from developing on the periphery of the retard roller 28 due to the feed roller 26 constantly rotating against it. If two documents, like 30 and 32, approach the nip between the feed and retard rollers 26 and 28, the document 32 is held by the retard roller 28, while the feed roller 26 moves the document 30 in the direction of arrow 42 into the document track 16.

The mechanism 10 also includes one-way clutches 44 and 46 which are secured to the shaft 48 as shown in FIG. 2. The shaft 48 is rotatably mounted in the frame 40, and the retard roller 28 is fixed to the shaft 48 to rotate therewith. The clutches 44 and 46 are conventional one-way clutches which are shown schematically in FIG. 2 to simplify the drawing; however, a conventional clutch, such as clutch #RC-040708, which is manufactured by Torrington, for example, may be used. The clutch 44 is installed so that its housing is secured to the frame 40 by a bracket 50, and its output member is secured to the shaft 48, with the clutch 44 permitting rotation only in a clockwise direction as viewed in FIG. 2. In this regard, the clutch 44 functions as an anti-backup element to prevent the retard roller 28 from rotating in a counter-clockwise direction.

The second clutch 46 has its output member secured to the shaft 48, and its housing has an operating means secured thereto as shown in FIG. 2. The function of the operating means is to periodically rotate the retard roller 28 in a clockwise direction so as to present a new portion of the periphery of the retard roller 28 to the feed roller 26 and thereby minimize wear on the retard roller 28. The operating means includes an actuating lever 52, a tension spring 54, a solenoid 56, and the controller 24. The actuating lever 52 has one end secured to the housing of the clutch 46, with the free end thereof being resiliently biased to a home position by a tension spring 54. When the solenoid 56 is energized by the controller 24, it pulls the free end of the actuating lever 52 in a clockwise direction, as viewed in Fig. 2, to thereby rotate the shaft 48 with the retard roller 28 thereon in a clockwise direction. The incremental rotation may be a fixed amount if the solenoid 56 is of fixed "throw" type, or the solenoid may be of a variable type to provide a variety of incremental rotations or "throws" under the control of the controller 24.

Notice from what has been described in the previous paragraph that the clutch 44 prevents the retard roller 28 from backing up, while the clutch 46 is used to incrementally rotate the retard roller 28 in the clockwise direction. With this construction, there is no "back-up" as discussed in the background of the invention. Notice, also, how easily the indexing of the retard roller 28 is effected.

Figure 3:
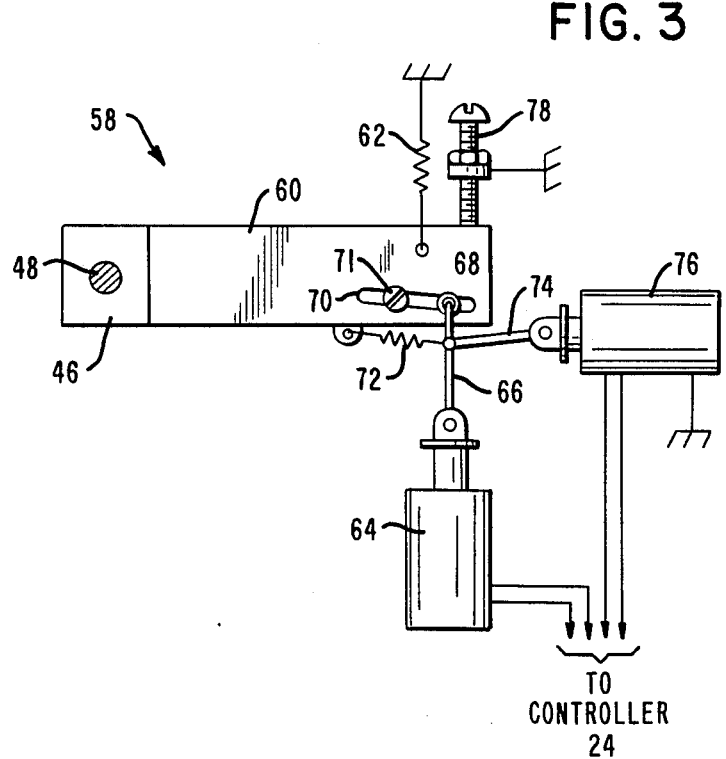
FIG. 3 is a diagrammatic view, taken along the line 3—3 of FIG. 2 to show a second embodiment of this invention.

Another feature of this invention is the ease with which the "throw" of the operating means may be adjusted. In this regard, FIG. 3 shows a second embodiment of the invention which is also shown in diagrammatic form, with the apparatus being designated generally as 58. The apparatus 58 includes the shaft 48 which supports the retard roller 28 shown in Fig. 2, and it also includes the second one-way clutch 46 which operates as previously described. The actuator arm 60 is secured to the housing of the clutch 46 so that when the actuator arm 60 is moved in a clockwise direction (as viewed in FIG. 3) through an arc, the shaft 48 is moved, correspondingly, through a similar arc.

The apparatus 58 includes means for adjusting the extent of rotation of the one-way clutch 46; this means includes a resilient means or spring 62 which is used to bias the actuator arm 60 to the home position shown in FIG. 3. The adjustment means mentioned also includes a first actuator or solenoid 64 which has an operating link 66 extending therefrom as shown. The distant end 68 of the link 66 is slidably mounted in a radially-aligned slot 70 in the actuating arm 60 so as to change the effective moment arm of the actuating arm 60 as will be described hereinafter. The operating link 66 is pulled to a home position relative to the slot 70 by a spring 72, and it is pulled to the active position shown, by a second adjustment means or operating link 74 associated with a second actuator or solenoid 76. A suitable fastener 71, positioned in the slot 70, provides an adjustable stop for the location of the home position for the link 66. The second link 74 has its distant end pivotally coupled to the operating link 66 between the ends of this link 66. When the solenoid 76 is energized by the controller 24, the link 74 is pulled into the body of the solenoid 76, to thereby move the operating link 66 towards the right side of the slot 70 (as viewed in FIG. 3); this action changes the effective moment arm of the actuator arm 60 and thereby decreases the extent of rotation or pivoting of the actuating arm 60 for the same linear pull by solenoid 64. However, when the link 66 is moved to the right of the slot 70 (as viewed in Fig. 3), the torque produced by the actuator arm 60 increases compared to the situation in which the link 66 is located at the left side of the slot 70.

The actuating arm 60 is held in the home position by the spring 62 and the stroke adjustment screw and lock nut combination 78 shown in FIG. 3. The actuating arm 60 is moved away from the home position by the solenoids 64 and 76 as previously described. These solenoids 64 and 76 may be conventional two step solenoids which provide additional flexibility to incrementally move the actuating arm 60 different degrees of rotation under the control of the controller 24.

What is claimed is:

1. An apparatus for feeding documents comprising:
   a feed roller and means for rotating said feed roller in a first direction of rotation;
   a stripper roller in operative engagement with said feed roller; and
   incremental means for incrementally rotating said stripper roller;
   said incremental means comprising:
   a shaft having said stripper roller secured thereto;
   a frame for rotatably supporting said shaft for rotation;
   a first one-way clutch secured to said shaft and said frame to permit said shaft to rotate only in said first direction;
   a second one-way clutch secured to said shaft;
   operating means secured to said second one-way clutch to rotate said stripper roller incrementally in said first direction whenever said operating means is energized; and
   means for energizing said operating means;
   said operating means including adjustment means for adjusting the extent of rotation of said second one-way clutch;
   said adjustment means including an actuator arm secured to said second one-way clutch, with said actuator arm being incrementally rotated by said adjustment means;
   said actuator arm having an effective moment arm and said adjustment means including resilient means for biasing said actuator arm to a home position and first means for moving said actuator arm from said home position through a predetermined arc when said first means is actuated; and
   said adjustment means further including second means for changing the length of said effective moment arm when said second means is actuated.

2. The apparatus as claimed in claim 1 in which said first and second means are coupled together and include first and second actuators, respectively.

3. The apparatus as claimed in claim 2 in which said operating means includes a controller and said first and second actuators are controlled by said controller.

4. An incremental motion mechanism comprising:
   a frame;
   an output shaft rotatably mounted in said frame; and
   incremental means for incrementally rotating said output shaft;
   said incremental means comprising:
   a first one-way clutch secured to said shaft and said frame to permit said shaft to rotate only in a first direction;
   a second one-way clutch secured to said shaft;
   operating means secured to said second clutch to rotate output shaft incrementally in said first direction whenever said operating means is energized; and means for energizing said operating means;

said operating means including adjustment means for adjusting the extent of rotation of said second one-way clutch;

said adjustment means including an actuator arm secured to said second one-way clutch, with said actuator arm being incrementally rotated by said adjustment means;

said actuator arm having an effective moment arm and said adjustment means including resilient means for biasing said actuator arm to a home position and first means for moving said actuator arm from said home position through a predetermined arc when said first means is actuated; and said adjustment means also including second means for changing the length of said effective moment arm of said actuating arm when said second means is actuated.

5. The mechanism as claimed in claim 4 in which said first and second means are coupled together and include first and second actuators, respectively.

6. The mechanism as claimed in claim 5 in which said operating means includes a controller and said first and second actuators are controlled by said controller.

7. An incremental motion mechanism comprising.

a frame;

an output shaft rotatably mounted in said frame; and incremental means for incrementally rotating said output shaft;

said incremental means comprising:

a first one-way clutch secured to said shaft and said frame to permit said shaft to rotate only in a first direction;

a second one-way clutch secured to said shaft;

operating means secured to said second clutch to rotate said output shaft incrementally in said first direction whenever said operating means is energized; and means for energizing said operating means;

said operating means including adjustment means for adjusting the extent of rotation of said second one-way clutch;

said adjustment means including an actuator arm secured to said second one-way clutch, with said actuator arm being incrementally rotated by said adjustment means;

said actuator arm having an effective moment arm and said adjustment means including resilient means for biasing said actuator arm to a home position and first means for moving said actuator arm from said home position through a predetermined arc when said first means is actuated;

said adjustment means also including a second means for changing the length of said effective moment arm of said actuating arm when said second means is actuated;

said first and second means being coupled together and including first and second actuators, respectively;

said operating means including a controller and said first and second actuators being controlled by said controller; and said actuating arm further having a radially-aligned slot therein and said first means including a first link having one end secured to said first actuator and the remaining end thereof pivotally secured to said actuator arm at said radially-aligned slot therein.

8. The mechanism as claimed in claim 7 in which said second means includes a second link having one end secured to said second actuator and the remaining end thereof pivotally secured to said first link between the ends of said first link.

* * * * *